(12) United States Patent
Simon et al.

(10) Patent No.: US 7,651,545 B2
(45) Date of Patent: Jan. 26, 2010

(54) METHOD FOR AGGLOMERATING AND PASSIVATING USED MATERIAL OR FINES RESULTING FROM THE PRODUCTION OF ORGANOHALOSILANES

(75) Inventors: Gérard Simon, Lyons (FR); Daniel Bajolet, Grenoble (FR); André Acloque, Lyons (FR)

(73) Assignee: Rhodia Chimie, Aubervilliers (FR)

( * ) Notice: Subject to any disclaimer, the term of this patent is extended or adjusted under 35 U.S.C. 154(b) by 146 days.

(21) Appl. No.: 10/580,257

(22) PCT Filed: Nov. 18, 2004

(86) PCT No.: PCT/FR2004/002939

§ 371 (c)(1),
(2), (4) Date: Mar. 29, 2007

(87) PCT Pub. No.: WO2005/063775

PCT Pub. Date: Jul. 14, 2005

(65) Prior Publication Data

US 2007/0266823 A1 Nov. 22, 2007

(30) Foreign Application Priority Data

Nov. 27, 2003 (FR) .................................. 03 13927

(51) Int. Cl.
*C22B 1/14* (2006.01)
*C22B 7/02* (2006.01)

(52) U.S. Cl. .......................................... 75/326; 75/773
(58) Field of Classification Search .................. 75/326, 75/773
See application file for complete search history.

(56) References Cited

U.S. PATENT DOCUMENTS

| 5,342,430 | A | | 8/1994 | Grocela-Kathe et al. |
| 5,505,903 | A | * | 4/1996 | Schrey et al. ................. 419/64 |
| 2007/0272056 | A1 | | 11/2007 | Simon |

FOREIGN PATENT DOCUMENTS

| EP | 0 287 934 A2 | 10/1988 |
| EP | 0 201 199 B1 | 7/1989 |
| EP | 1 345 866 A | 9/2003 |
| FR | 2 708 268 A | 2/1995 |
| WO | 02/46119 A1 | 6/2002 |

\* cited by examiner

*Primary Examiner*—George Wyszomierski
*Assistant Examiner*—Tima M McGuthry-Banks
(74) *Attorney, Agent, or Firm*—Buchanan, Ingersoll & Rooney P.C.

(57) ABSTRACT

The process for agglomerating and passivating the pulverulent used material and/or the pulverulent fines resulting from the production of organohalosilanes, comprises the mixing of this used material and/or fines with a binder chosen from aluminum silicates and the production of a solid agglomerated product by compression in a press, such as a roll type briquette machine. The invention also relates to the agglomerated product thus obtained and to its use in the recovery of certain metals, such as silicon and copper.

13 Claims, No Drawings

METHOD FOR AGGLOMERATING AND PASSIVATING USED MATERIAL OR FINES RESULTING FROM THE PRODUCTION OF ORGANOHALOSILANES

CROSS-REFERENCE TO RELATED APPLICATIONS

This application is a National stage filing under 35 U.S.C. §371 of International Application No. PCT/FR2004/002939, filed on November 18, 2004, which in turn claims priority to French Application No. 03 13927, filed November 27, 2003, the contents of which are incorporated herein by reference.

The present invention relates to an agglomeration process which makes possible the deactivation or passivation, the transportation and the recovery of pulverulent used materials and/or pulverulent residual fines resulting from the production of organohalosilanes, and more particularly from the production of methylchlorosilanes, by direct synthesis. The invention also relates to the products resulting from this agglomeration process and to the use of these products for the recovery, in particular, of the residual silicon metal and of metals such as copper.

The industrial use of the process for the direct synthesis of methylchlorosilanes according to the Rochow reaction (reaction of silicon metal with gaseous methyl chloride in the presence of copper-based catalyst) is generally carried out in a fluidized bed. The process requires bleeding or regular emptying of the fluidized bed, resulting in what it is convenient to refer to as used materials and residual fines from the synthesis. These used materials and/or residual fines are pulverulent and comprise, in addition to the silicon metal, possibly silicon oxides and elements such as chlorine, hydrogen or oxygen as well as elements such as copper, carbon, iron, aluminum, zinc, calcium, tin, manganese, and the like. These pulverulent used materials and these pulverulent fines have a highly reactive nature which makes it very difficult, indeed even impossible, to handle them and to transport them as they are. In particular, they react with water in the liquid or vapor form with evolution of hydrogen and exhibit a self-heating nature on contact with the air. The used materials have, for this reason, to be subjected to a deactivation treatment.

Furthermore, the used materials and the fines comprise high proportions of constituents, such as silicon and copper, which it would be advantageous to be able to recover.

U.S. Pat. No. 5,342,430 discloses a passivation process in which the used material is reacted with an aqueous medium comprising water and a surfactant, optionally at elevated temperature, and then a binder, such as a lignosulfonate, montmorillonite or bentonite, is introduced, it being possible for this treatment to be followed by removal of water.

EP-A-0 287 934 discloses a process for passivation by agglomeration of the used material (formation of pellets) and impregnation of the agglomerates with an organic binder to increase the cohesion of the agglomerates and to isolate them from ambient moisture. The binder can be a liquid organic binder having a viscosity which is sufficiently low to ensure its penetration into the agglomerate or else it can be applied in solution or in emulsion with an organic solvent or water. While water is the preferred means, both exhibit disadvantages according to the actual words of this document. The organic solvents present the usual emission problems. The water reacts with the silicon and brings about heating, and the operating conditions thus have to be strictly controlled. The organic binders include glucose, gums, adhesives, bitumens, waxes, starch and, preferably, lignin, in a liquid form and in particular in dilute aqueous solution.

EP-A-201 199 recommends combining the pulverulent used material with water, carrying out the granulation and covering the granules with an inert inorganic powder. From 5 to 50% by weight of water (with respect to the used material+ water mixture) are employed, in order to convert the silicon to silicon dioxide (which makes it possible to deactivate the silicon).

WO-A-02/46119 discloses that aluminum silicates make it possible to deactivate the used materials. The mixing is carried out in conventional mixers. The process preferably provides for the presence of an amount of water which can range from 10 to 40% by addition of water to the used material+ aluminum silicate mixture or by the use of an aluminum silicate slurry. The presence of water makes it possible to pass the mixture through an extruder, before recycling the composition in the manufacture of ceramic products.

The processes of the prior art present problems with regard to the processing conditions due to the use of volatile solvents or of water and/or result in products comprising water contents which are not very compatible with their transportation, their handling and their recovery, for example in the metallurgical industries.

An object of the present invention is thus to provide a novel process for the treatment of used materials and/or fines resulting from the direct synthesis which makes possible efficient deactivation or passivation of these used materials and/or of these fines and the achievement of a stable solid product which does not react with air or atmospheric moisture and which is non-self-heating, which can be transported and handled and which can in particular be directly subjected to recovery operations, in particular recovery of metals, such as silicon and copper, by the metallurgical industry.

Another object of the invention is to provide such a process which can be carried out at the lowest cost and in particular with a minimum number of stages.

It has been found, unexpectedly, that these objects, and others, can be achieved by a specific process for agglomerating in the absence of free water, of solvent or of liquid binder, in solution, dispersion, and the like.

A subject matter of the present invention is thus a process for agglomerating the pulverulent used material and/or the pulverulent fines resulting from the production of organohalosilanes, comprising:
(i) the mixing of this used material and/or fines with a binder chosen from aluminum silicates;
(ii) the production of a solid agglomerated product by compression in an appropriate press.

This process makes possible the production of a nonpulverulent product existing in the form of solid, hard and rigid agglomerates of defined shape. The agglomerated product is pacified or inert, that is to say that it does not react on contact with air and atmospheric moisture and that it is not self-heating; the agglomerates exhibit a cohesion which allows them to be handled and transported and the absence of free water allows them to be easily treated in recovery operations, for example in the metallurgical industry.

The expressions "used material" and "residual fines" have the usual meanings. It may be specified that they are used substances and fines resulting from the direct synthesis, thus comprising essentially silicon metal and possibly silicon oxides and small amounts of other materials, such as chlorine, hydrogen, oxygen, copper, carbon, iron, aluminum, zinc, calcium, tin, titanium, manganese, and the like.

The binder used is provided in a dry solid form but may nevertheless be hydrated to various extents. The process according to the invention does not provide for the addition of water. However, the provision of a limited amount of water, resulting in particular in the hydration of the binder, is not ruled out from the invention. Likewise, while this is not desired, the presence or the provision of a residual or reduced amount of free water in the binder is not, nevertheless, ruled out, provided that the overall dry and solid nature of the binder and the subsequent agglomeration operation are not brought into question. In an altogether preferred way, the binder does not comprise free water.

Mention may be made, among the preferred aluminum silicates or aluminosilicates, of bentonite, kaolin, diatomite, fuller's earth and more generally any hydrated form of aluminum silicate. Bentonite constitutes a preferred embodiment. For economic reasons, use will preferably be made of natural aluminosilicates. The particle size is not a critical parameter and, in any case, a person skilled in the art can very easily carry out routine tests in order to select the appropriate aluminosilicates. By way of indication, it may be specified that the bentonite used in the examples exhibited a mean particle diameter of approximately 35 μm (50% by number of particles <35 μm, 90% by number of particles <111 μm).

The binder/used material ratio can range in particular from 0.1/1 to 1.5/1 and is preferably between 0.3/1 and 1/1 by weight. It should be pointed out that, throughout the description and claims and unless otherwise mentioned, the limits are included when ranges of values are concerned.

The press advantageously exhibits means intended to confer a definite shape on the agglomerated product, by compression molding. Use may be made of any type of compression press (of the type used for the molding or the agglomeration by compression in a form, cavity or mold), such as a ram press and a roll type briquette machine. The presses used thus comprise cavities, forms or molds in which the product is agglomerated by compression and which confer, on the agglomerated product, its final shape, its cohesion and its mechanical stability.

In the present invention, preference will be given to cake, briquette or pellet forms with simple circular or semicircular, cylindrical or semicylindrical, or the like, geometric shapes.

Roll type briquette machines constitute a preferred embodiment. They comprise two rolls placed facing one another (parallel axes), at least one of which is arranged so as to be able to be driven in rotation and at least one of which comprises cavities of a defined shape. Generally, both rolls can be driven in rotation and in particular in opposite directions. A pressure can be exerted in an adjustable fashion between the two rolls. One of the rolls can be fixed in position on its axis and the other roll can be pressed against the preceding one using appropriate means, in particular by hydraulic means, such as pistons or jacks. It is also possible for both rolls to be movable the one toward the other in order to provide the desired pressure, for example by the use of hydraulic means as already mentioned. The roll type briquette machine thus applies a pressure, preferably an adjustable pressure, to the material which passes between the rolls, which material is molded in the cavities of defined shape which are provided at the surface of at least one of these rolls. Preferably, both rolls exhibit cavities with complementary shapes. Any desired shape can be given to the final molded-pressed material by choosing the shape of the cavities exhibited by the roll or rolls.

In order to obtain good agglomeration, it is possible to adjust the pressure applied in the press. Typically, for a roll type briquette machine, the pressure can be adjusted to between 10 and 80 kN/cm of roll width.

By way of illustration, agglomerates having a unit volume which can vary between 0.5 and 20 cm$^3$ can be produced. It goes without saying that these values are given solely by way of illustration.

The present invention makes it possible to produce inert agglomerates which have good cohesion and which can be handled and transported without requiring specific precautions; they are in particular easy to pour, which facilitates charging to and discharging from a dump truck, silo or the like.

Roll type briquette machines are designed and manufactured by companies such as Sahut-Conreur in Raismes, France, and K. R. Komarek Inc. in Elk Grove Village, Ill., USA.

The starting mixture is produced in an appropriate mixer or homogenizer. Any type of solid mixer may be involved. The mixing time can be of the order of a few minutes. A person skilled in the art is fully in a position to determine the mixing conditions to produce a mixture which is as homogeneous as possible.

The roll type briquette machines are generally fed via a feed device intended to force the material between the rolls. It can in particular be a screw device or similar device, e.g. positioned vertically above the facing surfaces of the two rolls. According to an optional characteristic, the mixture resulting from the mixer passes through this feed device and then through the press.

The agglomerates obtained according to the process of the invention are not self-heating or reactive with water. They can thus be handled and transported without specific measures dictated by official regulations being required.

These agglomerates, devoid of free water, can also be used as starting material for the purpose of the recovery of silicon metal and of other metals, such as copper. They can be used in particular in businesses such as the silicon metallurgical industry, the copper metallurgical industry, the iron metallurgical industry and casting. The agglomerates can also be used in the manufacture of ceramics, refractory compounds, and the like.

The solid agglomerated products obtained or capable of being obtained by the implementation of the process according to the invention are also subject-matters of the present invention.

Another subject matter of the present invention is an agglomerated product which comprises used material and/or fines resulting from the direct synthesis, and a binder chosen from aluminum silicates, according to a binder/used material ratio of between 0.1/1 and 1.5/1, preferably between 0.3/1 and 1/1, by weight and which does not comprise free water. This agglomerate exists in the form of a solid and rigid product, for example a molded product, for example in the form of cakes, briquettes or pellets with simple circular or semicircular, cylindrical or semicylindrical, or the like, geometric shapes, e.g. with a unit volume between 0.5 and 20 cm$^3$. It is in particular an agglomerated product as obtained by the implementation of the process according to the invention.

In this agglomerate, the binder is preferably bentonite.

A further subject matter of the present invention is the use of the agglomerates in accordance with the invention as starting material for the purpose of the recovery of a metal or of several of the metals present in the used materials or residual fines. These metals have been mentioned above; this use is targeted more particularly at the recovery of silicon metal and/or copper and/or iron. A subject matter of the invention is thus particularly the use of these agglomerates in the silicon metallurgical industry, in the copper metallurgical industry or in the iron metallurgical industry.

Another subject matter of the invention is the use of the agglomerates in accordance with the invention as starting material in the manufacture of ceramics, refractory compounds, and the like.

The present invention will now be described with the help of examples describing embodiments of the invention taken as nonlimiting examples.

EXAMPLE 1

3000 grams of powdered used materials and 3000 grams of powdered bentonite, i.e. 100% of the weight of used material, are charged to and mixed for a few minutes in a solid mixer-homogenizer (device such as Lodige horizontal mixer or mixer with planetary rotating blades). The mixture is introduced into a roll type briquette machine fed via a screw feeding device.
Rotational speed of the screw feeding device: 18 revolutions/minute.
Characteristics of the roll type briquette machine (Sahut Conreur type D150):
Gap: 7/10 mm.
Volume of the indentations: 0.7 cm$^3$.
Rotational speed of the rolls: 5 revolutions/minute.
Pressure: 50 knewtons/linear cm of roll width.

The agglomerates obtained are measured as non-self-heating in the Bowes-Cameron test (sample subjected to a chamber temperature of 140° C. for 24 hours, according to the Recommendations on the Transport of Dangerous Goods, Manual of Tests and Criteria, revised third edition, United Nations, New York and Geneva, 1999) and do not react on contact with water.

EXAMPLE 2

Under the same operating conditions as for example 1, per 3000 grams of used materials, 1285 grams of powdered bentonite, i.e. 43% of the weight of used material, are charged.

The agglomerates obtained are measured as non-self-heating in the Bowes-Cameron test (sample subjected to a chamber temperature of 140° C. for 24 hours) and do not react on contact with water.

EXAMPLE 3

Under the same operating conditions as for example 1, per 3000 grams of used materials, 900 grams of powdered bentonite, i.e. 30% of the weight of used material, are charged.

The agglomerates obtained are measured as non-self-heating in the Bowes-Cameron test (sample subjected to a chamber temperature of 140° C. for 24 hours) and do not react on contact with water.

It should be clearly understood that the invention defined by the appended claims is not limited to the specific embodiments indicated in the above description but encompasses the alternative forms thereof which depart neither from the scope nor from the spirit of the present invention.

What is claimed is:

1. A process for agglomerating and passivating pulverulent used material and/or pulverulent fines resulting from the production of organohalosilanes, said process being conducted in the absence of free water, the process comprising: (i) forming a mixture of used material and/or pulverulent fines resulting from the production of organohalosilanes and a binder comprising an aluminum silicate by mixing said used material and/or fines with said binder; (ii) producing a solid agglomerated product by compression of said mixture in a press.

2. The process as claimed in claim 1, wherein the aluminum silicate is bentonite.

3. The process as claimed in claim 1, wherein the ratio of binder to used material and/or fines is 0.1/1 to 1.5/1 by weight.

4. The process as claimed in claim 3, wherein the ratio of binder to used material and/or fines ratio is 0.3/1 to 1/1 by weight.

5. The process as claimed in claim 1, wherein said press is equipped with means for molding said solid agglomerated product by compression.

6. The process as claimed in claim 5, wherein said press is a roll type briquette machine.

7. The process as claimed in claim 1, wherein said solid agglomerated product has a unit volume of 0.5 to 20 cm$^3$.

8. The process as claimed in claim 1, wherein said solid agglomerated product is non-self-heating agglomerates.

9. The process of claim 1, wherein the process is conducted in the absence of solvent or liquid binder.

10. A solid, inert and non-self-heating agglomerated product which comprises a compressed mixture of (1) used material and/or residual fines resulting from the production of organohalosilanes and (2) an aluminum silicate, wherein said agglomerated product does not comprise free water.

11. The product as claimed in claim 10, wherein the ratio of aluminum silicate to used material and/or fines ratio is 0.1/1 to 1.5/1 by weight.

12. The product as claimed in claim 11, wherein said ratio is 0.3/1 to 1/1 by weight.

13. The product as claimed in claim 10, wherein the agglomerates have a unit volume of 0.5 to 20 cm$^3$.

* * * * *